United States Patent

[11] 3,583,304

| [72] | Inventor | Edison R. Brandt |
| | | Cohasset, Mass. |
| [21] | Appl. No. | 762,308 |
| [22] | Filed | Sept. 16, 1968 |
| [45] | Patented | June 8, 1971 |
| [73] | Assignee | Polaroid Corporation |
| | | Cambridge, Mass. |

[54] PHOTOGRAPHIC CAMERA
5 Claims, 4 Drawing Figs.

[52] U.S. Cl........................................................ 95/11.5,
240/1.3, 339/12
[51] Int. Cl....................................................... G03b 9/70
[50] Field of Search........................................ 95/11, 11.5;
240/1.3, 52.15; 339/12 G, 12 L, 12 Misc.

[56] References Cited

UNITED STATES PATENTS

| 2,738,476 | 3/1956 | Buguor............... | 240/52.15X |
| 3,144,527 | 8/1964 | Tolegain............. | 339/12X |
| 3,267,272 | 8/1966 | Fischer............... | 240/1.3 |
| 3,463,069 | 8/1969 | Kremp et al. ...... | 95/11.5 |
| 3,473,880 | 10/1969 | Wick................... | 240/1.3X |

FOREIGN PATENTS

| 1,111,697 | 11/1955 | France................ | 339/12 |

Primary Examiner—Samuel S. Matthews
Assistant Examiner—Fred L. Braun
Attorneys—Brown and Mikulka, William D. Roberson and James L. Neal ABSTRACT: A photographic camera for producing photographic exposures and igniting selected photoflash lamps linearly arrayed in timed sequence therewith includes terminals of magnetizable material for mounting a photoflash lamp assembly and establishing electrical contact between the assembly and the camera. The use of terminals composed of magnetizable materials for mounting and establishing electrical contact allows the user to easily remove and replace the photoflash lamp assembly when all the bulbs therein have been ignited.

INVENTOR.
Edison R. Brandt
BY Brown and Mikulka
and
James L. Neal
ATTORNEYS

PATENTED JUN 8 1971

3,583,304

INVENTOR.
Edison R. Brandt

BY
Brown and Mikulka
and
James R. Neal
ATTORNEYS

PHOTOGRAPHIC CAMERA

SUMMARY OF THE INVENTION

The photographic camera of this invention includes apparatus for producing photographic exposures, circuit means for electrically energizing photoflash lamps in timed relationship to exposure production and terminal means of magnetizable material for magnetically mounting a photoflash lamp assembly upon the camera and electrically connecting the assembly to a source of electrical energy, for example, a battery.

The photoflash lamp assembly includes terminals of magnetizable material cooperable with the camera terminal means and may house a single photoflash lamp or an array of lamps. A preferred photoflash lamp unit for use with this invention may be disposable and embody an array of flash lamps for sequential ignition. When all the lamps of one unit have been ignited, the unit is merely lifted off the camera, discarded and a fresh unit is dropped into place.

The highly uncomplicated photoflash lamp assembly mounting apparatus and electrical terminal means which characterizes the camera of this invention is simply constructed; it does not perform a mechanical latching function and thereby requires no movable parts. A photoflash lamp assembly is mounted and electrically connected by simply bringing it into contiguity with the terminal means of the camera. This maximizes convenience afforded by disposable photoflash lamp assemblies as well as reloadable assemblies.

It is a primary object of this invention to provide a photographic camera embodying simplified structure for mounting and electrically energizing a photoflash lamp assembly wherein convenience in the removal and mounting of such assemblies is maximized.

It is also an object of this invention to provide a photographic camera having terminal means of magnetic material for mounting a photoflash lamp assembly for electrical energization.

DETAILED DESCRIPTION OF THE DRAWINGS

Figure 1:
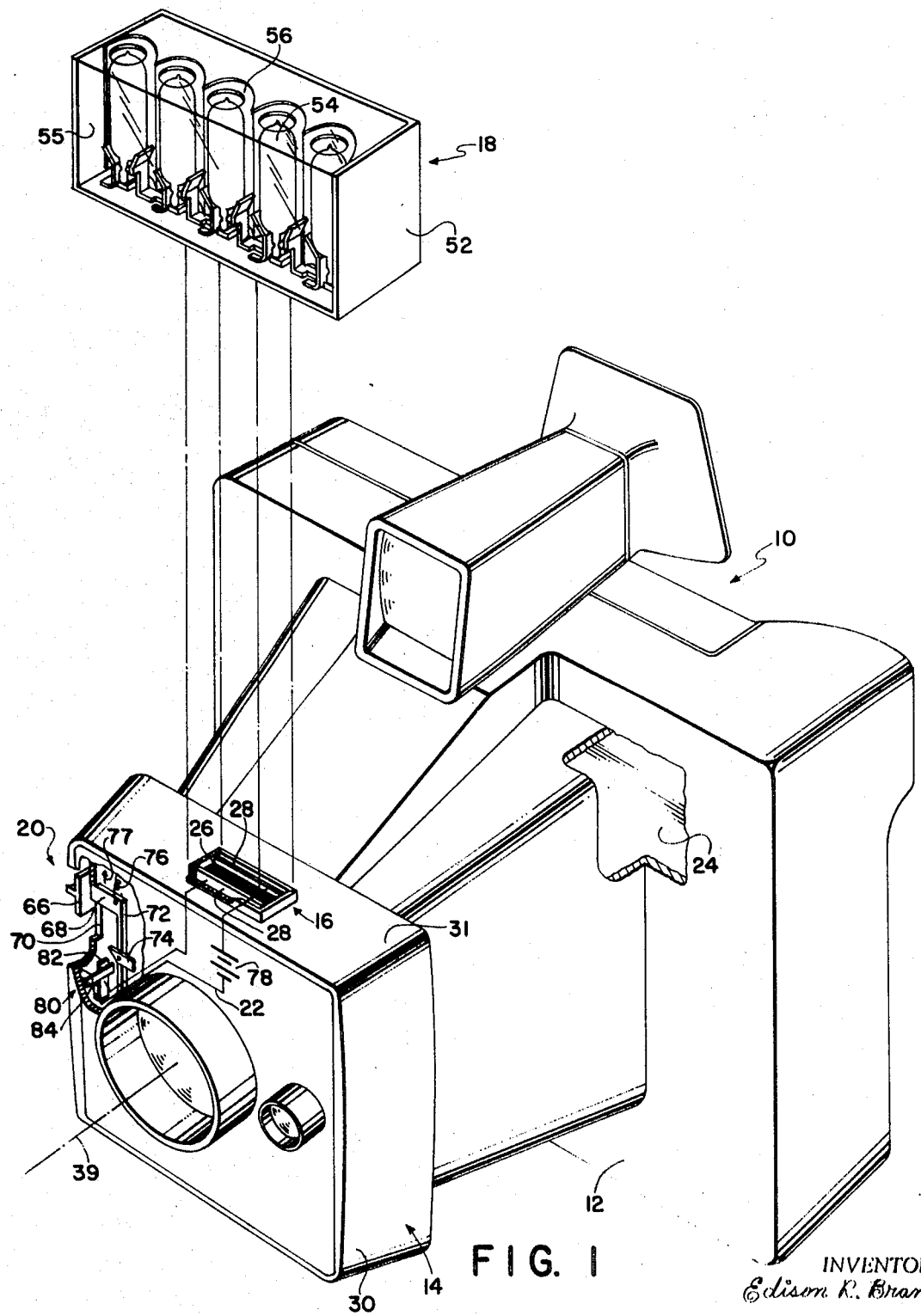
FIG. 1 is a perspective view of a preferred embodiment of this invention.
Figure 2:
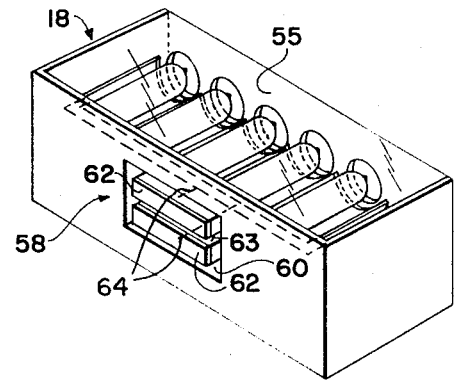
FIG. 2 is a perspective view of a photoflash lamp assembly usable with the embodiment of this invention shown in FIG. 1.
Figure 3:
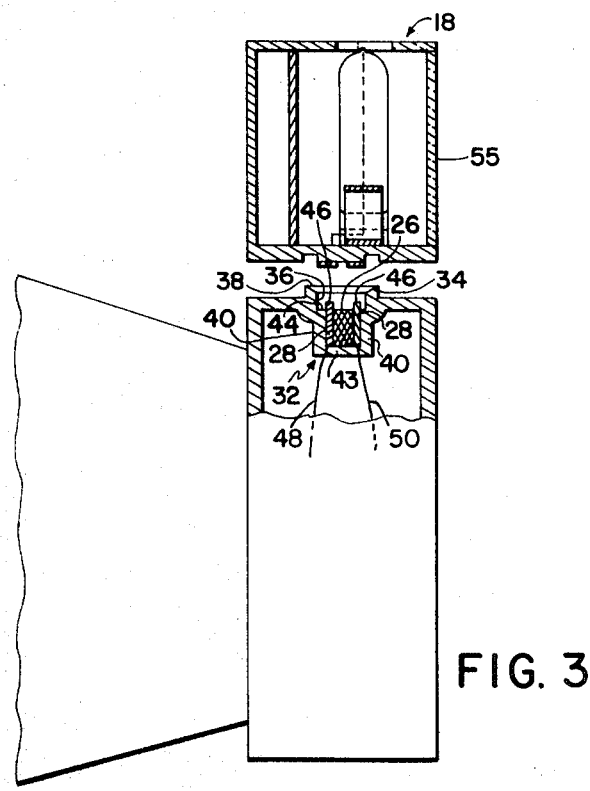
FIG. 3 is a fragmentary sectional view of the camera of FIG. 1 and the photoflash lamp assembly of FIG. 2.

Reference is now made to FIGS. 1 through 3.

Photographic camera 10 includes back portion 12, lens and shutter assembly 14, actuator means 20, photoflash assembly energization circuit 22 and terminal means 16 for mounting photoflash assembly 18 upon the camera and electrically connecting it to circuit 22.

Camera back 12 supports photosensitive material 24 for exposure to light reflected from a scene to be photographed during an exposure interval produced by lens and shutter assembly 14. The lens and shutter assembly may be of any convenient design. A suitable shutter is one of the general type described in U.S. Pat. application Ser. No. 673,574, filed Oct. 9, 1967, now U.S. Pat. No. 3,522,765, in the names of Bruce H. Johnson and Otto E. Wolff and entitled "Photographic Exposure Control Apparatus." Terminal means 16 mounts and electrically connects photoflash assembly 18 to the camera and includes electrically nonconductive magnet 26 interposed between a pair of contacts 28. Contacts 28 are constructed of a magnetizable material to form magnetic poles for magnet 26 and are electrically conductive to serve also as electrical contacts. The contacts may be of any suitable electrically conductive magnetizable material, for example, a ferrous metal. Magnet 26 is of electrically nonconductive material; for example, it may be a ceramic magnet. Accordingly, it provides the magnetic force for holding assembly 18 upon camera 10 and also serves as an insulating separator between contacts 28.

In the preferred embodiment of the invention, housing 30 for lens and shutter assembly 14 defines a flat surface 31 in which mounting and terminal means 16 is supported. Housing 30 forms well 32 having a peripheral upstanding flange 34 characterized by face 36 substantially normal to surface 31 and inclined face 38. Flange 34 orients assembly 14 relative to camera 10 in a manner hereafter described. The well is defined by sides 40, ends 42 and bottom 43. Sides 40 lie in planes substantially perpendicular to optical axis 39 of the lens and shutter assembly. Ends and bottom 43 complete enclosure of the well. Face 36 is set back from the inner surface of sides 40 to provide separation 44 between the peripheral flange and contacts 28 to facilitate mounting of assembly 18 as hereafter described. The contacts are configured as flat plates and are contiguous opposed sides 40 of well 32. An elongated edge 46 of each contact protrudes slightly beyond the plane or separating surface 44, out of well 32 and into the zone defined by peripheral flange 34. Edges 46 lie in a common plane substantially perpendicular to the plane of side 40. Ceramic magnet 26 is interposed between contacts 28 completely filling the portion of well 32 not occupied by the contacts and holding the contacts in the position contiguous sides 40. Ceramic magnet 26 and contacts 28 may be retained in the well by any suitable means, for example, they may be retained by a tight friction fit or by being adhesively bonded to bottom, sides and/or bottom of well 32. Conductors 48 and 50 pass from contacts 28 through bottom 43.

Photoflash assembly 18, subject to be mounted and electrically connected to camera 10 by mounting and terminal means 16, may be characterized by any desired format and may house one or more photoflash lamps. In FIG. 1 there is illustrated an assembly which houses a plurality of flash lamps for sequential energization in response to successive photographic exposures. For a complete description of an assembly of this type see U.S. Pat. application Ser. No. 764,062 filed Oct. 1, 1968 in the name of Edison R. Brandt and entitled "Photoflash Lamp Assembly." The assembly includes a housing 52, flash lamps 54 reflecting surfaces 56 for directing illumination from the lamps toward scene to be photographed and a switch means, not disclosed, for permitting ignition of a first flash lamp in response to a first exposure production while preventing ignition of the other flash lamps and then enabling one other flash lamp to be ignited in response to a subsequent exposure production while then preventing the remaining unused flash lamps from being ignited. The switch means continues to operate according to this mode until each of the lamps has been energized in response to successive exposure producing operations.

Reference is now made to FIG. 2 wherein terminal means 58 for assembly 18 is shown. The bottom surface of assembly 18 forms groove 60 configured for cooperation with peripheral flange 34. Groove 60 defines a zone in which a pair of magnetizable contacts 62 are disposed. The magnetizable contacts are separated by space 63 and parallel to each other in arrangement for location along edges 46 of contacts 28 when assembly 18 is mounted upon camera 10. Leads 64 extend from contacts 62 to complete an electrical connection through flash lamps 54 and the switch means. When unit 18 is operatively mounted upon camera 10, transparent face 55 is to be arranged substantially perpendicular to optical axis 39, directed toward the scene to be photographed. Orientation of assembly 18 is effected by the disposition of contacts 28 and contacts 62 and by cooperation between peripheral flange 34 and groove 60. Orientation of assembly 18 with terminal means 16 of the camera is performed by visually aligning contacts 62 with exposed edges 46 of contacts 28 and bringing them into abutment. As contacts 62 and 28 approach each other, the approximate visual alignment causes peripheral flange 34 to move into groove 60. Inclined face 38 of flange 34 tends to engage the edges of contacts 62 and cam them into accurate alignment with the foresaid edges 46. When contacts 62 abut edges 46, flange 34 has advanced into groove 60 by an amount sufficient to prevent relative turning movement between assembly 18 and camera 10.

When contacts 62 abut contacts 28, they are held in magnetic engagement. The result is magnetic retention of assembly 18 upon camera 10. The abutting relationship between contacts 62 and 28 is necessarily firm due to the continuous magnetic attraction between them. Thus a secure electrical connection is also made therebetween.

Actuator means 20 includes manually actuatable slide 66, offset 68 extending through elongated slot 70 in housing 30 and actuating rod 72 depending from offset 68 for operating the shutter assembly. Pawl means 74 is mounted upon rod 72 for operating flash synchronization switch 80. Spring means 76 is provided for biasing actuating means 20 for movement in the direction of arrow 77, opposite to the direction of movement required for operation of the shutter and switch 80.

Circuit means 22 includes a battery, shown schematically at 78, flash synchronization switch means 80 and contacts 28 of terminal means 16. Synchronization switch means 80 is a momentary contact switch including terminal 82 and resilient terminal 84. The resilient terminal is biased out of contact with terminal 82 and is capable of being deflected by pawl means 74 into contact with terminal 82. Circuit means 22 is open except when a photoflash lamp assembly is operatively mounted upon the camera and synchronization switch 80 is closed.

In the embodiment of the invention illustrated in FIG. 1, switch 80 is operated by pawl means 74 in response to shutter operating movement of rod 73. Closure of momentary contact switch 80 is synchronized with shutter operation so that the flash of light from a photoflash lamp will occur at the appropriate time during photographic exposure production. Any convenient apparatus could be substituted for the illustrated actuating means 20, switch 80 and circuit 22. One alternate arrangement could involve a switching system operated in response to exposure producing movement of the shutter to first close and then open a flash lamp ignition circuit.

In operation, a photoflash lamp unit such as unit 18 is mounted upon camera 10 and electrically connected in circuit 22 by terminal means 16, in the manner described above.

Slide 66 is then advanced against the bias of spring means 76 to operate the shutter (not shown) to expose photosensitive sheet material 24 to light reflected from a scene being photographed. In timed relationship with shutter operation, synchronization switch means 80 is operated. During the aforesaid advancement of slide 66 for operating the shutter, pawl means 74 engages terminal 84 of switch means 80 and deflects it into contact with terminal 82 and thereby briefly closes switch 80 to complete circuit 22 and ignite a photoflash lamp, the presence of assembly 18 completing the circuit across contacts 28. Advancement of slide 66 continues, and pawl 74 moves out of engagement with terminal 84 to permit terminal 84 to relax and open switch 80.

When assembly 18 includes a plurality of lamps for sequential ignition, a first lamp is initially connected in circuit 22 for energization during a first photographic exposure producing operation. Enabling switch means, operative in response to energization of the first lamp, is provided to connect a subsequent lamp in circuit 22 for energization in response to a subsequent exposure producing operation. Accordingly, the lamps are energized one at a time in response to successive photographic exposures. Means is provided for preventing operation of the enabling switch means while circuit 22 is completed. For example, the enabling switch means may include an operational time delay which exceeds time interval during which switch 80 is closed. In this manner, the enabling switch means does not operate until after switch 80 is opened.

Subsequent to exhaustion of the photoflash lamp or lamps, in one photoflash assembly, the assembly is removed to be discarded by simply lifting it from the camera and a fresh unit is dropped into place, in the manner previously described.

Figure 4:
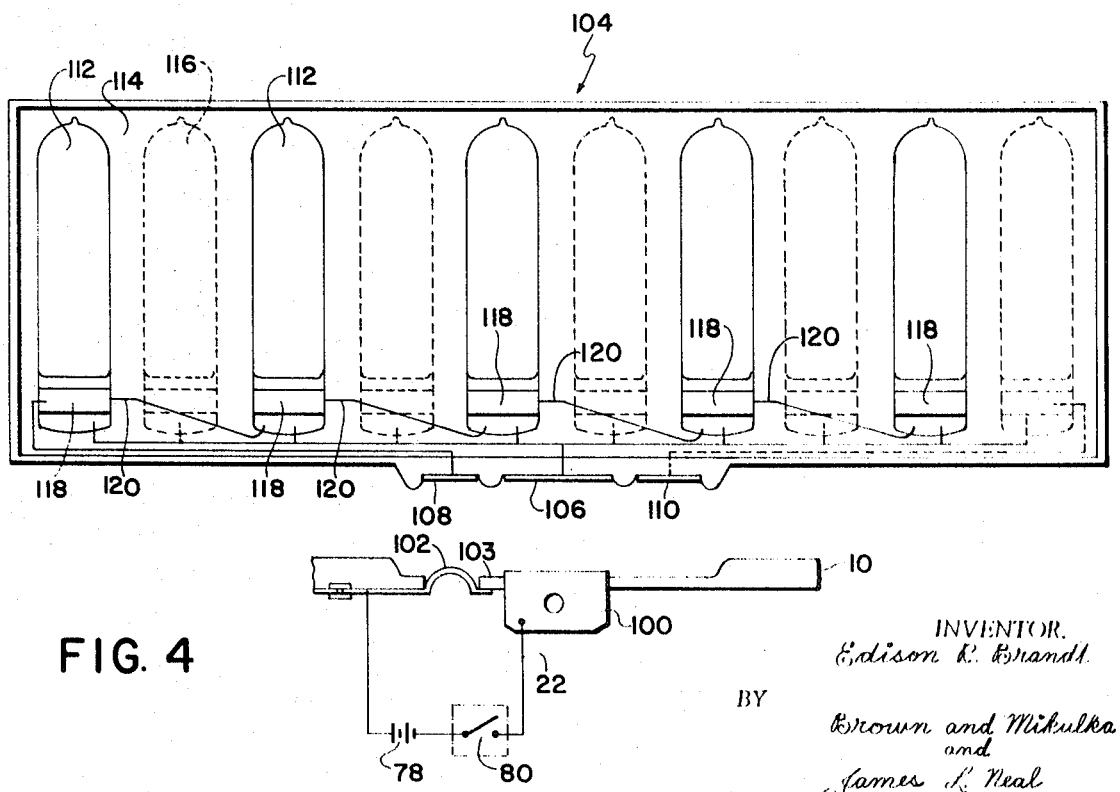
FIG. 4 illustrates one alternate embodiment of this invention.

Another embodiment of this invention will now be described in connection with FIG. 4.

Camera 10 includes permanent magnet 100 which forms one terminal of circuit 22 and electrically conductive terminal 102. Terminal 102 is resiliently biased to a position wherein it extends above surface 103, which position is illustrated in FIG. 4. Photoflash assembly 104 includes common terminal 106 of magnetic material. Terminal 106 is interposed between a pair of like terminals 108 and 110. Assembly 104 houses a plurality of lamps, a number of the lamps designated 112 being disposed on one side of reflecting surface 114, and lamps designated 116 being disposed on the opposite side of reflecting surface 114.

A lead from common terminal 106 is connected to each of the lamps; a lead from terminal 108 connects directly to one of the lamps designated 112. That lamp is connected by means of switch means 118 and lead 120 to a subsequent lamp 112; each of the remaining lamps 112 being connected to a succeeding lamp in like manner. One of the lamps 116 is connected directly to the terminal 110 and successive connections to the remaining lamps 116 are made by a switching means and lead arrangement identical to that for lamps 112.

Photoflash lamp assembly 104 is mounted upon camera 10 by bringing assembly terminal 106 into contact with camera terminal 100 so that electrical contact is made therebetween; magnetic contact is simultaneously established for holding assembly 104 upon the camera. When electrical and magnetic contact is made between terminals 100 and 106, one of the terminals 108 or 110 will engage terminal 102 of the camera and deflect it slightly so that the bias urges terminal 102 into continuous, firm contact with terminal 108. As illustrated in FIG. 4, contact is made between terminals 102 and 108 for electrically connecting lamps 112 in circuit 22. Switch means 80 is a momentary contact switch operative in response to means (not shown) for producing photographic exposures. When the switch is momentarily closed, a first lamp 112 is ignited and in response to ignition, switch 118 operates to complete circuit 22 through a subsequent lamp 112. Lamps 112 are in this manner, ignited in succession in response to successive exposure producing operations. When lamps 112 have all been ignited, assembly 104 may be lifted from the camera, turned 180° and brought back into connection with the camera. Magnetic and electrical contact will again be established between terminals 100 and 106 as described above, and terminal 110 will make electrical contact with terminal 102 for successively connecting lamps 116 in circuit 22 for successive ignition in response to successive photographic exposures in the same manner as described in connection with lamps 112.

Since certain changes may be made in the above apparatus without departing from the scope of the invention herein involved, it is intended that all matter contained in the above description or shown in the accompanying drawings shall be interpreted as illustrative and not in a limiting sense.

I claim:

1. A photographic camera usable in conjunction with a photoflash lamp assembly supporting linearly arrayed photoflash lamps for ignition to illuminate a scene to be photographed, said assembly having contacts for conducting electrical current to select ones of said lamps, said camera comprising:
    a. means for producing photographic exposures;
       alignment means for positioning said assembly to simultaneously array photoflash lamps therewithin in an operative position for illuminating said scene;
    b. circuit means for electrically energizing said photoflash lamps supported by said assembly in timed relationship to photographic exposure production; and
    c. terminal means magnetically engageable with said contacts of said assembly for removably retaining said assembly of linearly arrayed photoflash lamps upon said alignment means and for electrically connecting said contacts and said circuit means.

2. A photographic camera according to claim 1 wherein said terminal means comprises:
    a. spaced electrically conductive terminal members fixed within said alignment means for establishing electrical contact between said contacts of said linearly arrayed photoflash lamps and said circuit means and for mounting said linearly arrayed photoflash lamps upon said camera; and b. stationary electrically nonconductive magnetizing means fixed within said alignment means and positioned between said spaced terminal members for magnetizing said terminal members, said terminal members being operative to receive and retain in engagement said photoflash assembly contacts when so magnetized to provide said electrical contact as well as said assembly support.

3. A photographic camera according to claim 2 wherein said electrically nonconductive magnetizing means is present as a stationary ceramic magnet operable to magnetize said electrically conductive terminal members and to electrically insulate said terminal members from each other.

4. A photographic camera according to claim 1 wherein said alignment means comprises means defining a surface deformation adjacent said terminal means for positioning said assembly to simultaneously array said photoflash lamps therewithin in an operative position for illuminating said scene.

5. A photographic camera usable in conjunction with a photoflash lamp assembly supporting linearly arrayed photoflash lamps for ignition to illuminate a scene to be photographed, said assembly having contacts for conducting electrical current to select ones of said lamps, said camera comprising:

a. means for producing photographic exposures;
   alignment means for positioning said assembly to simultaneously array photoflash lamps therewithin in an operative position for illuminating said scene;
b. circuit means for electrically energizing said photoflash lamps supported by said assembly in timed relationship to photographic exposure production;
c. a pair of spaced, electrically conductive terminal members for establishing the electrical contact between said linearly arranged lamps and said circuit means and for magnetically mounting said assembly of linearly arrayed photoflash lamps upon said camera;
d. stationary electrically nonconductive magnetizing means interposed between said spaced contact members and fixed within said alignment means for magnetizing said members, thereby enabling said members to magnetically engage said contacts of said photoflash assembly when said assembly is contiguous thereto, said magnetic engagement being effective to mount said assembly and effect electrical connection between said photoflash lamp assembly contact members and said terminal means; and
e. means defining a surface deformation adjacent said terminal means cooperable with means defining a surface deformation of complimentary configuration upon said assembly for establishing a predetermined orientation of said assembly relative to said camera.

UNITED STATES PATENT OFFICE
CERTIFICATE OF CORRECTION

Patent No. 3,583,304          Dated June 8, 1971

Inventor(s) Edison R. Brandt

It is certified that error appears in the above-identified patent and that said Letters Patent are hereby corrected as shown below:

Column 3, line 26 "73" should be --72--.

Column 6, line 10 "arranged" should be --arrayed--.

Signed and sealed this 8th day of February 1972.

(SEAL)
Attest:

EDWARD M. FLETCHER, JR.       ROBERT GOTTSCHALK
Attesting Officer            Commissioner of Patents